United States Statutory Invention Registration [19]

[11] Reg. Number: H837

Peiffer et al.

[43] Published: Nov. 6, 1990

[54] DRILLING FLUIDS BASED ON POLYMER COMPLEXES

[75] Inventors: Dennis G. Peiffer, East Brunswick; Robert D. Lundberg, Bridgewater, both of N.J.; Lawrence P. Sedillo, Columbus, Ga.; John C. Newlove, Kingwood, Tex.

[73] Assignee: Exxon Research & Engineering Co., Florham Park, N.J.

[21] Appl. No.: 375,445

[22] Filed: Jul. 5, 1989

Related U.S. Application Data

[63] Continuation-in-part of Ser. No. 79,130, Jul. 29, 1987, abandoned, which is a continuation-in-part of Ser. No. 894,561, Aug. 8, 1986, abandoned, which is a continuation of Ser. No. 651,906, Sep. 19, 1984, abandoned.

[51] Int. Cl.[5] ..... C09K 7/06

[52] U.S. Cl. ..... 252/8.511; 252/8.515; 524/548; 524/555

[58] Field of Search ..... 524/548, 555; 252/8.511, 8.515

[56] References Cited

U.S. PATENT DOCUMENTS

| | | | |
|---|---|---|---|
| H495 | 7/1988 | Peiffer et al. | 252/8.515 |
| 4,425,461 | 1/1984 | Turner et al. | 252/8.51 |
| 4,425,462 | 1/1984 | Turner et al. | 252/8.51 |
| 4,447,338 | 5/1984 | Lundberg et al. | 252/8.5 M |
| 4,520,158 | 5/1985 | Peiffer et al. | 524/516 X |
| 4,522,960 | 6/1985 | Peiffer et al. | 524/516 X |
| 4,579,671 | 4/1986 | Lundberg et al. | 252/8.551 |
| 4,615,393 | 10/1986 | Sedillo et al. | 252/8.551 |
| 4,647,603 | 3/1987 | Lundberg et al. | 524/516 X |
| 4,740,319 | 4/1988 | Patel et al. | 524/555 X |
| 4,847,318 | 7/1989 | Dennis | 524/516 |

*Primary Examiner*—Robert L. Stoll
*Assistant Examiner*—Chhaya Sayala
*Attorney, Agent, or Firm*—Richard E. Nanfeldt

[57] ABSTRACT

An oil-based drilling mud which comprises an organic liquid substantially immiscible in water; about 1 to about 10 parts by weight of water per 100 parts by weight of the organic liquid; about 20 to about 50 lb./bbl. of at least one emulsifier; weighting material necessary to achieve the desired density; and about 0.25 to about 4.0 lb/bbl. of a hydrocarbon soluble polymeric complex formed from a water insoluble anionic polymer and a cationic polymer.

13 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DRILLING FLUIDS BASED ON POLYMER COMPLEXES

This application is a continuation-in-part of U.S. Ser. No. 079,130, filed July 29, 1987, now abandoned, which in turn is a continuation-in-part of U.S. Ser. No. 894,561, filed on Aug. 8, 1986, now abandoned, which in turn is a Continuation of U.S. Ser. No. 651,906, filed Sept. 19, 1984, now abandoned.

FIELD OF INVENTION

The present invention relates to polymeric complexes which function as viscosification agents when added to oil-based drilling muds which are the fluids used to maintain pressure, cool drill bits and lift cuttings from the holes in the drilling operation for oil and gas wells. The polymeric complex is formed from the interaction of a cationic and an anionic polymer.

The drilling muds formed from these polymeric complexes exhibit improved low and high temperature rheological properties as compared to drilling muds formed from powders of sulfonated thermoplastic polymers.

BACKGROUND OF THE INVENTION

In the field of drilling in the exploration for oil and gas, an important component is that of the formulation of drilling muds. Drilling muds are the fluids which are used to maintain pressure, cool drill bits, and lift cuttings from the holes and vary in composition over a wide spectrum. Generally, drilling muds are based on aqueous formulations or oil-based formulations.

A conventional oil-based drilling mud formulation is comprised of basically the following ingredients: oil (generally No. 2 diesel fuel), emulsified agents (alkaline soaps and fatty acids), wetting agents (dodecylbenzene sulfonate), water, barite or barium sulfate, (weighting agent), asbestos (employed as viscosification agent) and/or, amine treated clays (also as viscosification agent).

The above combination of ingredients is generally formulated to possess various weights based primarily on amount of barite added. For example, a typical drilling mud can vary in specific gravity from a range of about 7 pounds per gallon up to 17 pounds per gallon or even greater. This variation in specific gravity is primarily controlled by the amount of barite added. The above formulations perform adequately in a number of applications, primarily those where the use of oil-based drilling muds is dictated by the lack of stability of the formation in which drilling is taking place. For example, in various types of shale formation, the use of conventional water-based muds can result in a deterioration and collapse of the shale formation. The use of the oil-based formulations circumvents this problem. However, it is observed that the current oil-based drilling muds have some significant disadvantages. One disadvantage is that the incorporation of asbestos or asbestos fines can incur significant health problems, both during the mud formulation and potentially during the subsequent use of such formulations. Therefore, it is desirable to eliminate the use of asbestos completely in such drilling muds. On the other hand, the use of substitutes for asbestos in this application has; heretofore, not been particularly successful in that the resulting viscosification agents must maintain adequate viscosities under the drilling conditions which can involve high temperature and high shear conditions.

There has been a substantial need for a drilling fluid which would exhibit good performance at high temperature in water sensitive formations. Past experience has shown that oil-based drilling fluids can provide good performance in water sensitive formations, and the state of the art systems can perform well up to about 350° F. Typically, in such formations, the failure of the viscosities in current muds is circumvented by the addition of more viscosifier during the circulation of the drilling mud. While this solution is adequate at moderate temperatures, when much higher temperatures are encountered (example: geothermal wells or natural gas wells), the degradation of the viscosifier can be so rapid that the additional costs for a viscosifier can be uneconomical. There is a need; therefore, for drilling fluids which can maintain their viscosity and gel strength at temperatures up to and exceeding 400° F. These needs are not adequately met by the current drilling fluids, even with the oil-based drilling muds often employed.

This invention describes an approach to viscosification of oil-based drilling muds which permits the substitution of a polymeric complex for asbestos fines and amine clays. The resulting polymer-modified drilling muds display improved low and high temperature rheological properties which include improved gel strength at up to temperatures or 400° F. and higher, based on tests conducted for 16 hours at such temperatures.

It has also been shown that sulfonated EPDM is very effective as a viscosifier for oil-based drilling muds, as described in U.S. Ser. No. 292,235 entitled, "Drilling Mud Viscosification Agents Based on Sulfonated Ionomers." We have found that sulfonated EPDM provides good viscosification at temperatures of about 300° F. and below when formulated in a mud based on fresh water, but loses its effectiveness at higher temperatures.

In U.S. Ser. No. 292,233, a high temperature drilling mud was formulated by the incorporation of a powdered, sulfonated polystyrene directly into the drilling mud. The instant application differs from U.S. Ser. No. 292,233 in that a latex of the sulfonated polystyrene is used to formulate the drilling mud. Quite unexpectedly, the use of the instant polymer complexes in drilling mud rather than the sulfonated polystyrenes, results in a drilling mud having improved low temperature rheological properties.

The instant invention will describe polymeric complexes which will provide oil-based drilling muds having provided improved, excellent gel strength at low and high temperatures and may be effective at even higher temperatures.

A second facet of the instant invention relates to the use of these materials in formulations which employ high concentrations of salt in the aqueous phase. The polymer complexes which are the preferred embodiment of this invention, lose some of their efficacy in salt water. It has been found that the combination of a suitable non-ionic emulsifier with the polymer complexes gives formulations which are effective with salt water. Therefore, these systems give formulations which perform well at low temperatures and in the presence of salt water phases, which is a highly desired objective in the drilling fluids industry.

SUMMARY OF THE INVENTION

The present invention relates to polymer complexes which function as viscosification agents when added to oil-based drilling muds which, are the fluids used to maintain pressure, cool drill bits and lift cuttings from the holes in the drilling operation for oil and gas wells.

The drilling muds formed from these polymer complexes exhibit improved low and high temperature rheological properties as compared to drilling muds formed from powders of sulfonated thermoplastic polymers.

GENERAL DESCRIPTION OF THE INVENTION

The present invention describes a new class of viscosification agents for oil-based drilling muds which are used during operation of gas and oil wells, wherein these viscosification agents are polymer complexes. The oil-based drilling muds of the instant invention minimally comprise, but can also include other additives; an organic liquid such as an oil, fresh water or salt water, an emulsifier, a wetting agent, a weighting material and a polymer complex. In 9general, the oil-based drilling mud has a specific gravity of about 7 pounds per gallon to about 20 pounds per gallon, more preferably about 10 to about 16, and most preferably about 12 to about 16. A typical oil-based drilling mud, as envisioned by the instant invention, comprises: an oil; about 1 to about 10 parts by weight of water per 100 parts by weight of the oil, more preferably about 3 to about 5; and 20 to about 50 lb/bbl. of an emulsifier and/or supplementary emulsifier; about ½ to about 5 lb/bbl. of a wetting agent; and a sufficient amount of weighting material (barium sulfate or barite) necessary to give the desired mud density which comprises less than bout 800 lb/bbl. of barium sulfate, more preferably about 5 to about 750, and most preferably about 10 to about 70; and about 0.1 to about 50 lb/bbl. of a polymer complex.

The oil employed in the oil-based drilling mud is generally a No. 2 diesel fuel, but it can be other commercially available hydrocarbon solvents such as kerosene, fuel oils or selected crude. If crudes are used, they should be weathered and must be free of emulsion breakers.

Typical, but non-limiting examples of suitable emulsifiers which can be readily employed are magnesium or calcium soaps of fatty acids.

Typical, but non-limiting examples of a suitable wetting agent which can be readily employed is an alkylaryl sulfonate.

Typical, but non-limiting examples of a weighting material which can be readily employed is barite or a barium sulfate which may optionally be surface-treated with other cations, such as calcium.

In general, the water insoluble interpolymer complex comprises a mixture of a polymer comprised of anionic groups such as metal sulfonates and a polymer containing basic amine groups such as pyridine or other amine species. The anionic polymer contains from about 10 to about 200 meq. pendant ionomeric groups per 100 grams of polymer, more preferably from 10 to 100 meq. pendant ionomeric groups. The ionic groups may be conveniently selected from the groups consisting of carboxylate, phosphonate, and sulfonate, preferably sulfonate groups. In most instances, the anionic polymers utilized in the instant invention are neutralized with the basic materials selected from Groups IA, IIA, IVA, VIA, VIIA, VIIIA, IB and IIB of the Periodic Table of Elements and lead, aluminum, tin and antimony, as well as ammonium and amine counterions. Anionic polymers which are subject to the process of the instant invention are illimitable and include both plastic and elastic polymers. Specific polymers include sulfonated polystyrene, sulfonated t-butul styrene, sulfonated para-methylstyrene, sulfonated ethylene copolymers, sulfonated propylene copolymers, sulfonated styrene/acrylonitrile copolymers, sulfonated styrene-/alkyl methacrylate copolymers, alkyl acrylate copolymers, maleic copolymers, alkyl malcate copolymers, sulfonated block copolymers of styrene/ethylene oxide, acrylic acid copolymers with styrene, sulfonated polyisobutylene, sulfonated ethylenepropylene terpolymers, sulfonated polyisoprene, and sulfonated elastomers and their copolymers. The preferred polymers of the instant invention are ethylenepropylene terpolymers and polystyrene, wherein the ethylenepropylene terpolymer is most preferred.

Neutralization of the anionic polymers with appropriate metal hydroxides, metal acetates, metal oxides, or ammonium hydroxide etc., can be conducted by means well-known in the art. For example, the sulfonation process as with butyl rubber containing a small 0.3 to 1.0 mole percent unsaturation can be conducted in a suitable solvent such as toluene, with acetyl sulfate as the sulfonated agent, such as described in U.S. Pat. No. 3,836,511. The resulting sulfonic acid derivative can then be neturalized with a number of different neutralization agents such as a sodium phenolate and similar metal salts. The amounts of such neutralization agents employed will normally be equal stoichiometrically to the amount of free acid in the polymer plus any unreacted reagent which is still present. It is preferred that the amount of neutralizing agent be equal to the molar amount of sulfonating agent originally employed plus 10 percent more to insure full neutralization. The use of more of such neturalization agent is not critical. Sufficient neutralization agent is necessary to effect at least 50 percent neutralization of the sulfonic acid groups present in the polymer, preferably at least 90 percent, and most preferably essentially complete neutralization of such acid groups should be effected.

The degree of neutralization of said anionic groups may vary from 0 (free acid form) to greater than 100 mole percent. With the utilization of neutralized anionic in this instant invention, it is preferred that the degree of neutralization be substantially complete, that is with no substantial free acid present and without substantial excess of the base other than that needed to insure neutralization. The neturalized anionic polymers possess greater thermal stability compared to its acid form. Thus, it is clear that the polymers which are normally utilized in the instant invention comprise substantially neutralized pendant groups, and in fact, an excess of the neutralizing material may be utilized without defeating the objects of the instant invention.

The anionic polymers of the instant invention may vary in number average molecular weight as measured by GPC from 1,000 to 10,000,000 preferably from 5,000 to 50,000, most preferably from 10,000 to 200,000. These polymers may be prepared by methods known in the art, for example, see U.S. Pat. No. 3,836,511, hereby incorporated by reference.

The water insoluble, ionomeric polymers may be incorporated into a solvent system of an organic liquid and a polar cosolvent to form a first solution at a level of from 0.2 to 10 weight percent and more preferably from about 0.5 to 10 weight percent, based on the organic liquid and the polar cosolvent.

Specific examples of preferred anionic polymers which are useful in the instant invention include sulfonated polystyrene, sulfonated poly-t-butyl styrene, sulfonated para-methylstyrene sulfonated polyethylene (substantially noncrystalline), and sulfonated ethylene copolymers, sulfonated polypropylene (substantially noncrystalline), and sulfonated polypropylene copolymers, sulfonated styrenealkyl methacrylate copolymers (styrene)-acrylic acid copolymers, alkyl acrylate copolymers maleic and maleic acid ester copolymers, sulfonated polyisobutylene, sulfonated ethylenepropylene terpolymers, sulfonated polyisoprene, sulfonated polyvinyl toluene and sulfonated polyvinyl toluene copolymers.

The anionic polymers of the instant invention may be prepared prior to incorporation into the organic solvent, or by neutralization of the acid from in-situ. For example, preferably the acid derivative is neutralized immediately after preparation. For example, if the sulfonation of polystyrene is conducted in solution, then the neutralization of that acid derivative can be conducted immediately following the sulfonation procedure. The neutralized anionic polymer may then be isolated by means well-known to those skilled in the art, i.e., coagulation, steam stripping, or solvent evaporation, because the neturalized polymer has sufficient thermal stability to be dried for employment at a later time in the process of the instant invention. It is well-known that the unneutralized sulfonic acid derivatives do not possess good thermal stability and the above operations avoid that problem.

It is also possible to neutralize the acid form of these anionic polymers in situ; however, this is not a preferred operation, since in situ neutralization requires preparation of the sulfonic acid in the organic liquid which is to be subjected to the instant process, or the acid form of the anionic polymer must be dissolved in said organic liquid. The latter approach may involve handling of an acid form of an anionic polymer which has limited thermal stability. Therefore, it is quite apparent that the prepartion and isolation of a neutralized anionic polymer affords the maximum latitude in formulation, less problems in handling polymers of limited thermal stability and maximum control over the final mixture of anionic polymer, polar cosolvent and organic liquid.

We have surprisingly found that a very important factor in determining the strength of the interaction between the amine-containing polymer and the sulfonate-containing polymer is the nature of the counterion. There are, broadly speaking, three major classes of such counterions. The first class, which are less preferred, are those metals of Group I and Group IIA, which include Li, Na, K, etc., Be, Mg, Ca, etc. We have found that these species do not interact as strongly with amine groups as the more preferred species described below. Those metals are commonly defined as members of the transition elements (see chemical text: "Chemical Principles and Properties," by M. J. Sienko and R. A. Plane, McGraw Hill Book Co., 1974, page 19). These metal cations are best exemplified by zinc and interact strongly with pyridine and similar amines. As a consequence, a zinc neutralized sulfonated polymer intereacts much more strongly with a styrene/vinyl pyridine copolymer than does a magnesium or sodium neutralized system. It is for this reason that the transition elements are preferred with zinc, copper, iron, nickel and cobalt being especially preferred. We also include antimony and lead as suitable cations.

A third species which is preferred is the free acid of the sulfonated polymer, which will also interact with amine-containing polymers. In this latter case, it is clear that the interaction is a classic acid-base interaction, while with the transition metals, a true coordination complex is created, which is due to the donation of the electron pair of the nitrogen element. This distinction is a very important one and sets these complexes apart from classic acid-base interactions. The surprising observation is that such coordination complexes can form in such extreme dilution insofar as interacting groups are concerned, and that they are apparently formed so far removed from their expected stoichiometry, (based on small molecule analogs).

The organic liquids, which may be utilized in the instant invention, are selected with relation to the anionic and cationic polymer and vice-versa. The organic liquid is selected from the group consisting of paraffinic, napthenic and aromatic hydrocarbons, cyclic aliphatic ethers, aliphatic ethers, or organic aliphatic esters and mixtures thereof.

The amine containing polymers employed in the instant invention are polymers containing about 0.1 to about 25 weight percent amine groups, more preferably about 0.5 to about 20, and most preferably about 1 to about 15. An especially preferred cationic polymer is vinyl pyridine. The molecular weight of the amine polymers, as measured by gel chromatography permeation, is about 10,000 to about 10,000,000 more preferably about 200,000 to about 5,000,000 and most preferably 50,000 to about 3,000,000. The cationic polymer is dissovled in a solvent system identical to the solvent system used to form the first solution of the anionic polymer. The second solution of the cationic polymer solvent and polar cosolvent contains about 0.1 to about 25 weight percent of cationic polymer, more preferably about 0.5 to about 15, most preferably about 0.5 to about 10.

The first solution of the anionic polymer and the second solution of the amine containing polymer are mixed together to form the interpolymer complex which is the association of the anionic and cationic polymers through the formation of a complex which leads to a network formation. The molar ratio of the anionic/cationic polymers is about 0.1 to about 20, more preferably about 0.2 to about 15, and most preferably about 0.4 to about 10.

Specific examples of organic liquids to be employed with the various types of polymers are:

| Polymer | Organic Liquid |
|---|---|
| sulfonated polystyrene | benzene, toluene, ethyl benzene, methylethyl ketone, xylene, styrene, ethylenedichloride, methylene chloride |
| sulfonated poly-t-butyl-styrene | benzene, toluene, xylene, ethyl benzene styrene, t-butyl styrene, aliphatic oils, aromatic oils, hexane, heptane, decane, nonane. |
| sulfonated ethylene-propylene terpolymer | pentane, aliphatic and aromatic solvents, oils such as "Solvent 100 Neutral," "150 Neutral" and similar oils, benzene diesel oil, toluene, xylene, ethyl benzene, pentane, hexane, heptane, octane, isooctane, nonane, decane aromatic solvents, ketone sol- |

-continued

| Polymer | Organic Liquid |
|---|---|
| | vents. |
| sulfonated styrene-methyl methacrylate copolymer | dioxane, halogenated aliphatics, e.g., methylene chloride, tetrahydrofuran. |
| sulfonated polyisobutylene | saturated aliphatic hydrocarbons, diisobutylene, triisobutylene, aromatic and alkyl substituted aromatic hydrocarbons, chlorinated hydrocarbons, n-butyl ether, n-amyl, ether, methyl oleate, aliphatic oils, oils predominantly paraffinic in nature and mixtures containing napthenic hydrocarbons. "Solvent 100 Neutral," "Solvent 150 Neutral" and all related oils, low molecular weight polymeric oils such as squalene, white oils and process oils having 60 percent or less aromatic content. |
| sulfonated polyvinyl toluene | toluene benzene, xylene, cyclohexane, ethyl benzene, styrene, methylene chloride, ethylene dichloride. |
| vinyl pyridine with styrene or t-butyl styrene | benzene, toluene, xylene, ethyl benzene, styrene, t-butyl styrene, aliphatic oils, aromatic oils, hexane, heptane, decane, nonane. |

The solution of the hydrocarbon soluble complex and organic liquid are added to the drilling mud formulation by conventional solution techniques to form the polymer modified drilling muds of the instant invention.

DETAILED DESCRIPTION OF THE PREFERRED EMBODIMENT

The following are preferred embodiments of the instant invention.

EXAMPLE 1

Preparation of Styrene-4-Vinyl Pyridine Copolymer

A copolymer of styrene-4-vinylpyridine was prepared via a free radical emulsion copolymerization process. The preparation was conducted as follows:

In a suitable, stirred reaction vessel under a nitrogen blanket the following ingredients were charged.

120 ml. distilled water
50 g. styrene
3.2 g. sodium lauryl sulfate
0.1 g. dodecylthiol
0.2 g. potassium persulfate
4.7 g. 4-vinyl pyridine The polymerization was conducted at 50° C. for 24 hours and the resultant emulsion was fluid and uniform. Three ml. of methanol containing 0.1% of hydroquinone was added as an inhibitor and the reaction mixture was precipitated in a large excess of acetone. The precipitate was filtered, then suspended in methanol and blended in a Waring blender to finally disperse the coagulated polymer. The suspension was filtered and dryed in a vacuum oven at 60° C. for 24 hours.

EXAMPLE 2

Preparation of Sulfonated EPDM

The preparation of sulfonated EPDM has been well-described in the patent and published literature for example, see U.S. Pat. No. 4,184,988 or ACS Monograph edited by A. Eisenberg, 1980, p. 4). A zinc sulfonated EPDM was prepared via those procedures containing 10 meq. of zinc sulfonate, designated TP 398. The resulting polymer was available as a free-flowing crumb and employed in that form as a blending component in the following examples.

EXAMPLE 3

Preparation of Polymer Complex

The polymer complex of sulfonated EPDM and polystyrene-Co-4-vinyl pyridine is prepared by charging the required amounts of each polymer to a flask, adding xylene in sufficient quantity to produce the desired concentration and stirring at room temperature until a homogeneous solution is obtained. This generally requires from 2 to 24 hours depending on the concentration required.

EXAMPLE 4

The use of the polymer complex as an oil mud viscosifier is shown in its inclusion in an OIL FAZE MUD SYSTEM (Dresser Magcobar Inc.). Specifically these oil based muds were prepared using conventional laboratory methods. A typical mud was prepared by mixing 205.82 g. of No. 2 diesel oil, 34.76 g. Oil Faze (Magcobar), 1.5 g. SE-11 and 1.5 g. DV33 (Magcobar). To this mixture was added 10 g. of $CaCl_2$ in 21 ml. of water. The mud was weighed with 226.35 g. of Barite and then 4.4 g. of additional $CaCl_2$ was added. The control contained amine-treated clay at a 3 lb/bbl. treat rate. The sodium salt of the sulfonated styrene (1.7 mole % sulfonate units) was added at 1 and 2 lb/bbl. treat rates or (1.1 and 2.2 grams respectively). The remaining two examples both contain poly styrenevinyl pyridine (6 mole % pyridine) at 1 lb/bbl. treat rate. Into one of these was added an additional 1 lb/bbl. of sodium styrene sulfonate. And into the other was added Zinc-Sulfo EPDM (10 milliequiv. Zinc (II)) at a 1 lb/bbl. treat rate. The mud was then measured into aliquots and aged at 150° F., 300° F. and 400° F. for 16 hours in pressurized mud cells. The cells were then cooled to room temperature and then rheological properties of the mud were measured on a Fann Model 35 viscometer at 115° F. The results are shown in Table 1.

TABLE 1

The use of the polymer complex as an oil mud viscosifier is shown in its inclusion in an OILFAZE MUD SYSTEM (Dresser Magcobar Inc.)

| Temp(F.) | Rheology | (Control) | 1#SPS | 2#SPS | 1#SPS/ 1#PSVP | 1#ZnEPDM/ 1#PSVP |
|---|---|---|---|---|---|---|
| 150 | AV | 36 | 45 | 40 | 37 | 79 |
| | PV | 23 | 31 | 25 | 24 | 44 |
| | YP | 26 | 28 | 30 | 37 | 70 |

TABLE 1-continued

The use of the polymer complex as an oil mud viscosifier is shown in its inclusion in an OILFAZE MUD SYSTEM (Dresser Magcobar Inc.)

| Temp(F.) | Rheology | (Control) | 1#SPS | 2#SPS | 1#SPS/ 1#PSVP | 1#ZnEPDM/ 1#PSVP |
|---|---|---|---|---|---|---|
| | ES | 580 | 560 | 600 | 560 | 2000+ |
| 300 | AV | 36 | 41 | 64 | 52 | 93 |
| | PV | 27 | 30 | 40 | 33 | 55 |
| | YP | 18 | 22 | 48 | 38 | 76 |
| | ES | 240 | 320 | 400 | 400 | 380 |
| 400 | AV | 36 | 40 | 43 | 42 | 50 |
| | PV | 26 | 30 | 31 | 32 | 34 |
| | YP | 10 | 20 | 24 | 20 | 32 |
| | ES | 120 | 500 | 520 | 540 | 560 |

What is claimed is:

1. An oil-based drilling mud which comprises:

(a) a hydrocarbon liquid substantially immiscible in water;

(b) about 1 to about 10 parts by weight of water per 100 parts by weight of the hydrocarbon liquid;

(c) about 20 to about 50 lb/bbl. of at least one emulsifier;

(d) weighting material necessary to achieve the desired density; and (e) about 0.25 to about 4.0 lb/bbl. of a water insoluble, hydrocarbon soluble polymeric complex formed from a sulfonated polymer and a water insoluble vinyl pyridine polymer, wherein said vinyl pyridine has a number average molecular weight of about 1,000 to about 10,000 wherein said sulfonated polymer is an unneutralized or neutralized sulfonated polymer which has about 10 to about 200 meq. of pendant unneutralized $SO_3H$ groups per 100 grams of polymer and has a number average molecular weight of about 1,000 to 10,000 and said $SO_3H$ groups are neutralized with an ammonium or metal counterion, a molar ratio of said sulfonated polymer to said vinyl pyridine being about 0.1 to about 20.

2. A process according to claim 1 wherein said metal counterion is selected from the group consisting of antimony, tin, lead or Groups IA, IIA, IB and IIB of the Periodic Table of Elements.

3. A mud according to claim 1 wherein said $SO_3H$ groups are at least 90 mole percent neutralized.

4. A mud according to claim 1 wherein said neutralized sulfonated polymer is formed from an elastoeric polymer.

5. A mud according to claim 4 wherein said elastomeric polymer is selected from the group consisting of EPDM termpolymer and butyl rubber.

6. A drilling mud according to claim 1 wherein said weighting material is barite or barium sulfate.

7. A drilling mud according to claim 1 wherein the concentration level of said weighting material is sufficient to give said drilling mud a specific gravity of about 7 pounds per gallon to about 20 pounds per gallon.

8. A drilling mud according to claim 1 wherein said hydrocarbon liquid is an oil.

9. A drilling mud according to claim 1 wherein said hydrocarbon liquid is a hydrocarbon solvent.

10. A drilling mud according to claim 1 wherein said emulsifier is a magnesium or calcium soap of a fatty acid.

11. A drilling mud according to claim 1 wherein said water is salt water.

12. A drilling mud according to claim 1 wherein the concentration of said water is about 3 to about 5 parts by weight per 100 parts by weight of said hydrocarbon liquid.

13. A drilling mud according to claim 1 wherein said hydrocarbon liquid is a diesel oil.

* * * * *